United States Patent
Braun et al.

(10) Patent No.: US 6,547,138 B1
(45) Date of Patent: Apr. 15, 2003

(54) CONTACTING DEVICE

(75) Inventors: Gerhard Braun, Bretzfeld-Bitzfeld (DE); Michael Heim, Heilbronn (DE); Manfred Reichardt, Weinsberg (DE)

(73) Assignee: Amphenol-Tuchel Electronics GmbH (DE)

( * ) Notice: Subject to any disclaimer, the term of this patent is extended or adjusted under 35 U.S.C. 154(b) by 51 days.

(21) Appl. No.: 09/625,309

(22) Filed: Jul. 25, 2000

(30) Foreign Application Priority Data

Jul. 26, 1999 (DE) .......................................... 199 34 964
Dec. 24, 1999 (DE) .......................................... 199 63 148

(51) Int. Cl.⁷ .............................. G06K 7/06; G06K 7/00
(52) U.S. Cl. ........................................ 235/441; 235/486
(58) Field of Search ................................ 235/441, 483, 235/485, 486, 487, 495; 439/326, 607, 630; 379/357.01, 433.09, 433.11, 433.12, 433.13, 144.04, 211.05

(56) References Cited

U.S. PATENT DOCUMENTS 4,743,746 A * 5/1988 Murschall et al. .......... 235/441
5,320,552 A * 6/1994 Reichardt et al. .......... 439/630
5,718,609 A * 2/1998 Braun et al. ................ 235/441
5,996,891 A * 12/1999 Braun ........................ 235/441
6,106,317 A * 8/2000 Michaelis et al. .......... 235/486
6,149,466 A * 11/2000 Bricaud et al. ............. 235/441

FOREIGN PATENT DOCUMENTS

| DE | 197 43 937 | 4/1999 |
| EP | 0 472 692 | 7/1995 |
| EP | 0 782 089 | 7/1997 |
| EP | 0 840 246 | 5/1998 |
| EP | 0 595 305 | 1/1999 |

* cited by examiner

*Primary Examiner*—Michael G. Lee
*Assistant Examiner*—Larry D Taylor
(74) *Attorney, Agent, or Firm*—Blank Rome LLP

(57) ABSTRACT

The invention relates to a contacting device for a chip card, wherein the term chip card also includes so-called IC cards or a SIM (subscriber identity module). In any case, the chip card comprises a chip (a contact image) with corresponding contact surfaces which, with the card being inserted, are contacted in the contacting device by corresponding contacts of the contacting device.

10 Claims, 3 Drawing Sheets

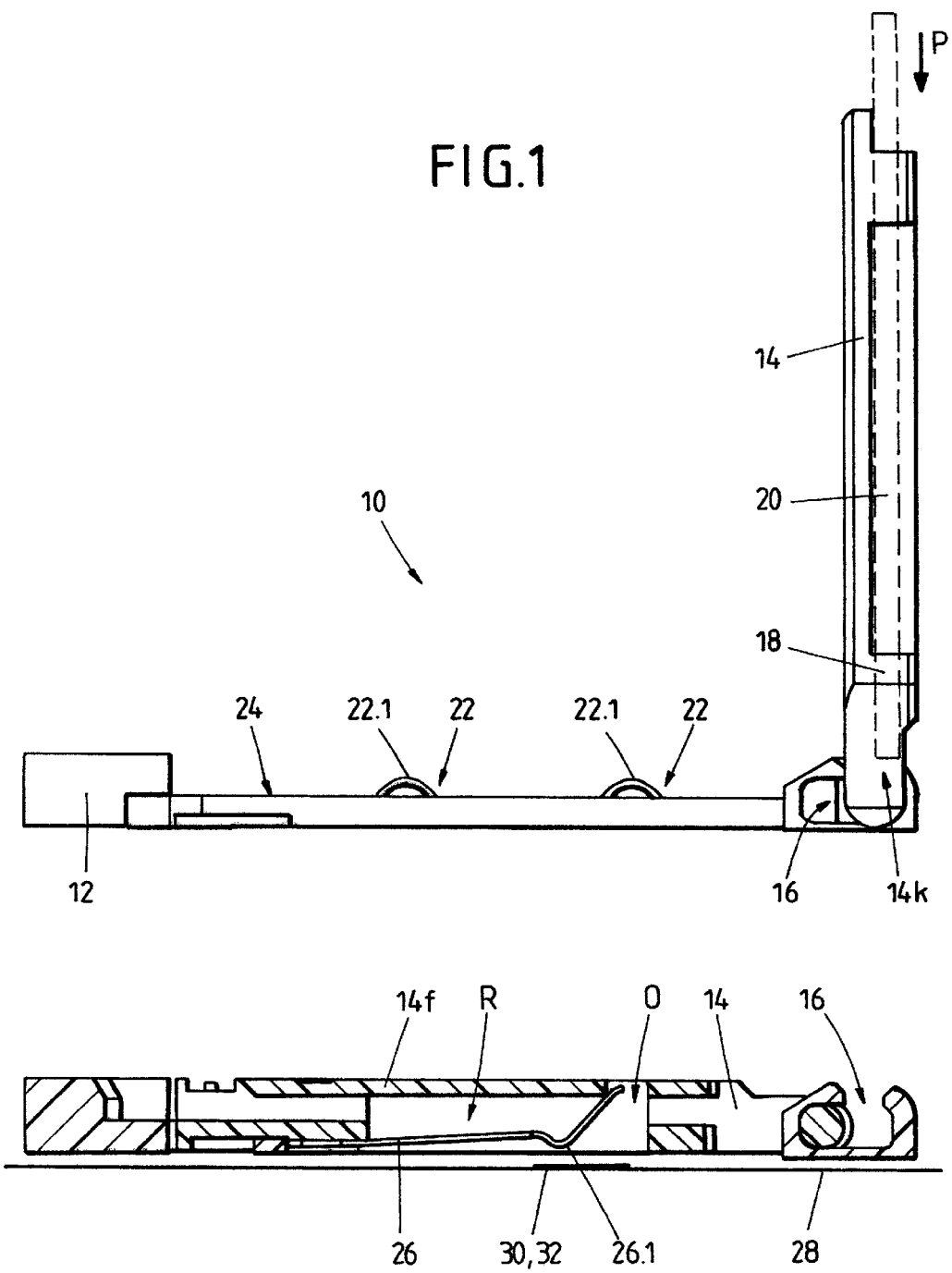

CONTACTING DEVICE

BACKGROUND OF THE INVENTION

The present invention relates to a contacting device for a chip card wherein the term chip card also includes so-called IC cards or a SIM (subscriber identity module). In any case, the chip card has a chip (a contact image) with corresponding contact surfaces which, when the card is inserted, are contacted in the contacting device with corresponding contacts of the contacting device.

DESCRIPTION OF THE RELATED ART

A known contacting device comprises a housing with a housing body, in which contacts for contacting corresponding contact surfaces on the chip card are arranged, and a cover, which is (usually) pivotably connected to the housing body, for receiving the chip card, wherein the cover, after being pivoted against the base body and subsequent parallel displacement relative to the base body, can be locked therewith. The cover can be of a single-part or multi-part construction so that in the following the term cover is always to be understood also in the sense of a cover part.

Such a contacting device is known in practice.

A similar contacting device is described in EP 0 472 692 B1. In order to indicate the locked state, the known contacting device has two separate switching contacts as well as a short circuit bridge arranged in the cover.

The disadvantage of this device is that the locked state between the cover and the housing body is indicated also when no chip card is present.

When manufacturing the contacting device, the contacts, including the switching contacts, are soldered onto a corresponding printed circuit board. This is carried out with the cover being closed (locked). Accordingly, the known device has a further disadvantage in that during the soldering process of the contacting device on a printed circuit board the switching contacts are mechanically and thermally loaded and this results in a loss of contacting power.

EP 0 595 305 B1 describes an IC card reader with a switch comprised of two switching contacts. As in the configuration of EP 0 472 692 B1, there is also one objection to be raised in this case in that two switching contacts are necessary.

DE 197 43 937 A1 discloses a contacting device for a SIM card with an indicator for the presence of a card wherein, however, the indicator is already activated when the cover is not yet in its locking position. This can result in operational errors.

BRIEF SUMMARY OF THE INVENTION

The invention has the object to provide a contacting device of the aforementioned kind which is of a simple configuration and is activate exclusively in the operations position.

The principal idea of the invention is to design and arrange the switching contact such that it is activated exclusively when the chip card is inserted and the cover is locked. For this purpose, the switching contact can be brought into a first contact position with corresponding contact locations on a correlated printed circuit board by means of the chip card, for example, inserted into the cover, when placing the cover onto the housing body. However, according to the invention, this first contact position is designed to remain electrically ineffective. The gist of the invention also furthermore presupposes in this respect that the switching contact, when locking the cover relative to the housing body, is brought into a second contact position in which the switching contact is electrically activated wherein this second contact position, for example, can be short-circuited with the aid of the switching contact.

Based on the contacting device of the aforementioned kind, the invention therefore provides a switching contact arranged in the cover which is designed and arranged such that it is electrically activated exclusively when the chip card is inserted and the cover is locked on the housing body.

In this context, the switching contact can co-operate with a first contact location and a second contact location which are arranged perpendicularly to the displacement direction of the cover in a plane parallel to the cover at a spacing to one another in the locking position wherein the contact locations end at the same location in the displacement direction of the cover, wherein, however, one of the contact locations is shorter than the other.

In this embodiment the switching contact therefore rests against only one contact location in the afore described first contact position. The switching contact reaches both contact locations at the same time only upon displacement of the cover into the locking position so that it is only now electrically activated (for example, short-circuited).

In order to keep the wear of the switching contact, especially during displacement of the cover into the locking position, as minimal as possible, an alternative embodiment suggests to design both contact locations in the same form size), but to divide one contact location into an electrically not activatable portion and an electrically activatable portion, wherein the electrically activatable portion is positioned in front of the electrically not activatable portion in the displacement direction of the cover.

In this embodiment it is prevented that the switching contact during the displacement movement of the cover must ascend onto the contact location which is elevated, if only by a minimal amount. Instead, in this embodiment it is achieved that the switching contact glides along a defined plane wherein this plane has the aforementioned two contact positions.

This second embodiment is especially advantageous when a slotted switching contact is used. In this context, the term "slotted" switching contact is to be understood in the sense that the switching contact is still of a single-part construction but has a penetration (a slot) in the axial direction so that, for example, parallel extending portions are formed which are connected at their ends by the switching contact material.

The two contact positions described above in detail can also be realized by means of a switching contact which has two contact zones spaced apart (arranged one after another) in the axial direction wherein, in analogy to the above description, the activation occurs only in the second contact position. The contact locations on the printed circuit board are then also arranged one after another.

Configurational problems may occur because of the limited spatial conditions in such a contacting device and a minimum spacing between the adjacently positioned contact locations of the printed circuit board.

Accordingly, a contacting device is proposed in which the legs (switching contact legs) are formed in the direction toward the correlated contact locations in an asymmetrically convex configuration such that the contact portions of the legs cooperating with the contact locations have a greater spacing relative to one another in comparison to a shape that is symmetrically convex relative to the central longitudinal axis of the legs.

By enlarging the spacing of the contact portions of the two legs of the switching contacts, the spacing of the correlated contact locations on the printed circuit board can be enlarged accordingly and the safety of the contacting device can thus be increased.

Simultaneously, by providing a convex configuration of the legs, a safe contacting on the corresponding contact locations is ensured.

The switching contact is arranged in the cover and can be, for example, embedded in the insulating material of the cover with portions thereof by injection molding or can be pressed onto or snapped into the cover. According to one embodiment, when the cover is open (without card), the free end (contact end) is designed to project into the space which is occupied by the chip card in the operational position. This position is to be maintained by the switching contact even when the cover (without card) is closed. Conversely, when the card is inserted, the card pushes the switching contact away into the first, electrically inoperable contact position (as soon as the cover is placed onto the housing body but is not yet locked thereto).

A further embodiment suggests that the switching contact is arranged and embodied such that it is not mechanically loaded even when the cover is closed and locked but no chip card is inserted.

For this purpose, a cover surface can have an opening into which the free contact end projects if no chip card is inserted in the device. This has the advantage that the contacting device can be soldered without mechanical tensioning of the switching contact onto a corresponding printed circuit board.

A control edge of the switching contact, i.e., the edge which is loaded by the chip card, can be embodied so as to be electrically insulated. This means that a short circuit between the card and the switching contact can be reliably prevented because the short circuit bridge (second contact position of the switching contact) will take on the potential of the contact locations on the printed circuit board when switching takes place.

In comparison to the aforementioned EP 0 472 692 B1 the following advantages result:

Instead of two switching contacts only a single switching contact is required. The switching contact can be activated only with inserted card and in the locked state of the contacting device. In this context, the chip card can be arranged in a corresponding recess in the housing cover but also within the housing body. When soldering the contacting device onto a correlated printed circuit board (with locked cover, but without card), the switching contact is mechanically not loaded.

Further features of the invention result from the features of the dependent claims as well as the other application documents.

BRIEF DESCRIPTION OF THE DRAWINGS

The invention will be explained in the following in more detail with the aid of different embodiments.

It is shown, in schematic representation, in

FIG. 1 a contacting device with open cover in a side view;

FIG. 2 the contacting device according to FIG. 1 in the locked state, but without chip card, in section;

DETAILED DESCRIPTION OF THE DRAWINGS

Figure 4:
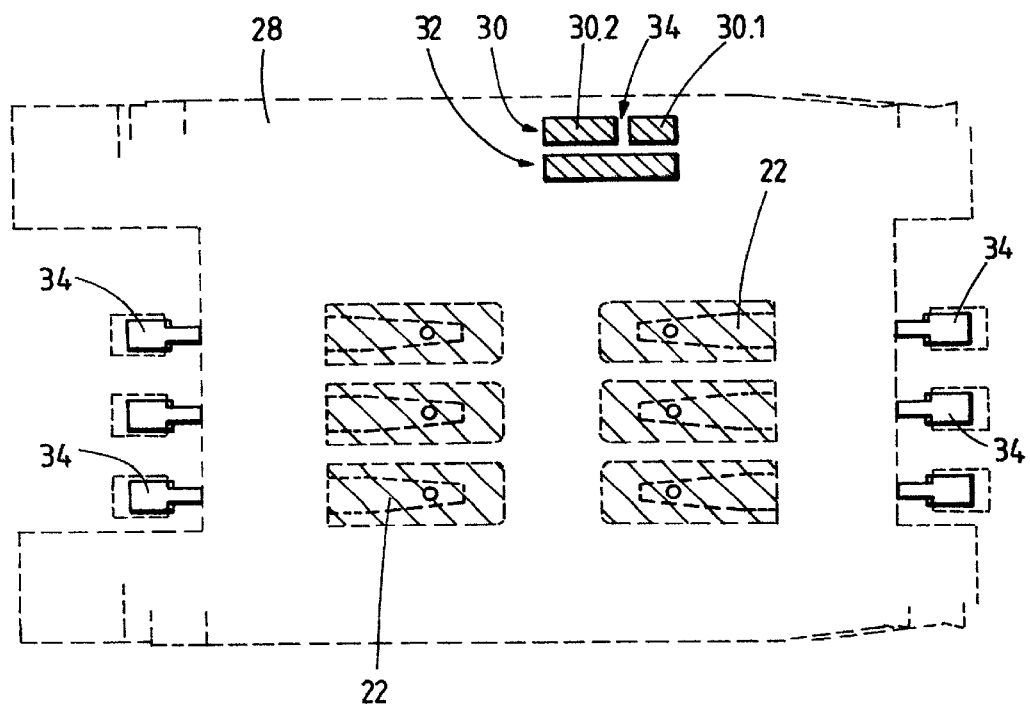
FIG. 4 a plan view onto a corresponding printed circuit board.

In FIG. 1 the reference numeral 10 indicates a contacting device according to the invention which is comprised of a housing body 12 and a cover 14 pivotably (joint 16) connected thereto.

The cover 14 has guide rails 18 extending in the direction toward the joint 16 on its edges along which a corresponding chip card 20 can be inserted when the cover 14 is in the open position.

Contacts 22 are arranged in the housing body 12 which project with their contact ends 22.1 from a contact surface 24.

In the cover 14 a switching contact 26 is arranged which, as shown in FIG. 2, projects without load into the space R as well as an opening 0 of an upper cover surface 14f even when the cover 14 is closed but without a chip card 20 being inserted. The switching contact 26 has a curved contact portion 26.1 whose function will be explained in more detail in the following.

In FIG. 2 the reference numeral 28 indicates a printed circuit board onto which the contacts 22 are soldered (FIG. 4: soldering locations 34).

In the position according to FIG. 2 the switching contact 26 is positioned at a spacing to the printed circuit board 28.

On the printed circuit board 28 (FIG. 4) two contact locations 30, 32 are arranged for the contacts 22 in addition to the soldering locations 34. Each contact location has a rectangular shape. The contact locations 30, 32 extend adjacent to one another. The contact location 30, however, is interrupted in the longitudinal direction at 34. The two partial portions of the contact location 30 are referenced by 30.1 and 30.2.

The contact portion 30.1 is electrically inactive (insulated) while the port ion 30.2 as well as the contact location 32 are electrically activatable.

The function of the device is as follows:

As indicated schematically in FIG. 1 (arrow P), a chip card 20 is introduced into the cover 14 until it contacts a rearward contact edge 14k. In this context, the chip card 20 pushes the switching contact 26 away (to the left in the Figure). Subsequently, the cover 14 is pivoted about the joint 16 against the housing body 12 until the contact surfaces on the chip card 20 contact the contact ends 22.1 of the contacts 22. At the same time, the contact area 26.1 of the switching contact 26 contacts the contact portion 30.1 and the contact location 32 of the printed circuit board 28.

Since the contact portion 30.1 is electrically inactive, this first contact position of the switching contact 26 remains ineffective.

Figure 3:
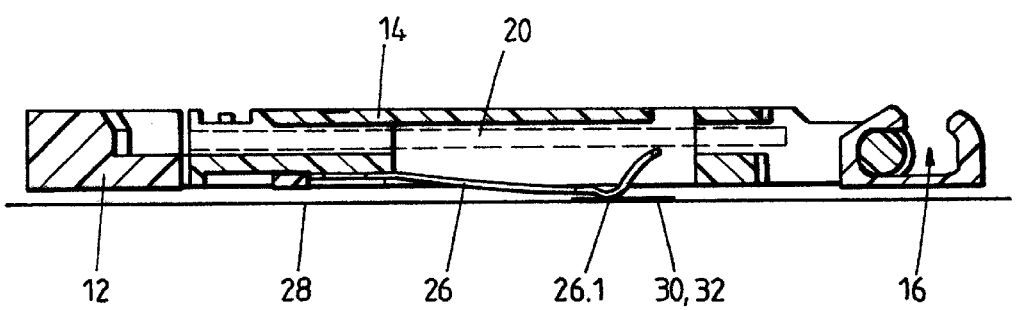
FIG. 3 the contacting device according to FIG. 1 in the locked state with inserted chip card, in section.

The cover 14 is now being moved along the joint 16 parallel to the housing body 12 (to the left in FIGS. 2, 3) until it reaches the final locking position represented in the FIGS. 2, 3.

The switching contact 26 is moved parallel thereto until it rests against the contact portion 30.2 and the contact location 32 of the printed circuit board 28 which together with the switching contact 26 form a short-circuit bridge that indicates now the functional position of the chip card 20 in the contacting device 10.

Figure 5:
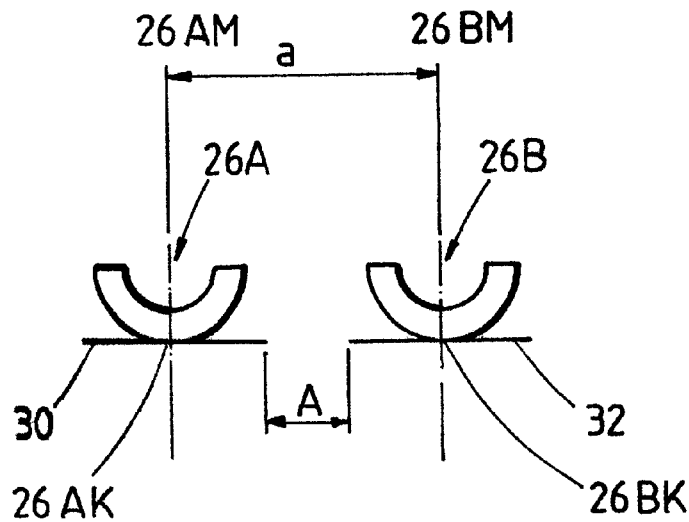
FIG. 5 two legs of a switching contact each having a symmetric convex shape.
Figure 6:
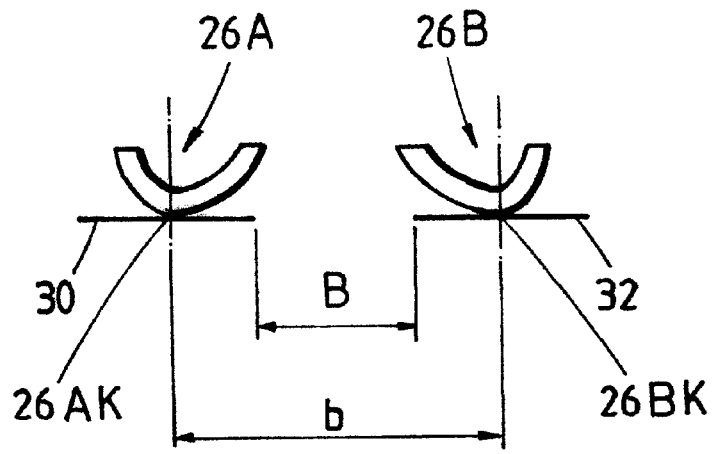
FIG. 6 two legs of the switching contact having an asymmetric convex shape.

FIGS. 5 and 6 show that, by means of an "outwardly asymmetrically staggered" shape of the switching contact legs 26A, 26B, the corresponding contact portions 26AK, 26BK in the embodiment according to FIG. 6 have a greater spacing b relative to the embodiment according to FIG. 1 (spacing a).

The central longitudinal axes 26AM, 26BM of the legs 26A, 26B are shown in both Figures for a better illustration of this feature.

Accordingly, the contact portion 26AK of the leg 26A in FIG. 6 is displaced to the left relative to FIG. 5 and the contact portion 26BK of the leg 26B in FIG. 6 is displaced to the right relative to FIG. 5.

This means that the spacing of correlated contact locations 30, 32 can be enlarged also in the embodiment according to FIG. 6 relative to the embodiment according to FIG. 5 (spacing B>spacing A).

What is claimed is:

1. A contacting device for a chip card with the following features:
   a housing with
   a housing body, in which contacts for contacting corresponding contact surfaces on the chip card are arranged,
   a cover pivotably connected on the housing body, wherein the cover, after being pivoted against the housing body and after subsequent parallel displacement relative to the housing body, can be locked thereat,
   a switching contact arranged in the cover and embodied and arranged such that said switching contact is electrically activated exclusively when a chip card is inserted and the cover is locked on the housing body, wherein the switching contact cooperates with a first and a second contact location which are arranged perpendicularly to the displacement direction of the cover in a plane parallel to the cover at a spacing to one another in the locking position.

2. The contacting device according to claim 1, wherein the contact locations in the displacement direction of the cover end at the same location, wherein, however, one of the contact locations is shorter than the other.

3. The contacting device according to claim 1, wherein both contact locations have an identical shape, but one contact location is divided into an electrically not activatable and an electrically activatable portion and the electrically activatable portion extends in front of the electrically not activatable portion in the displacement direction of the cover.

4. The contacting device according to claim 1, wherein one free end of the switching contact, when the cover is closed but without chip card,
   projects into a space R which is occupied by the chip card in its operational position, or
   projects into an opening 0 provided in a cover surface delimiting the cover.

5. The contacting device according to claim 1, wherein the switching contact is of a single-part construction.

6. The contacting device according to claim 1, wherein the switching contact is slotted at least partially in the axial direction under formation of two switching contact legs.

7. The contacting device according to claim 6, wherein the legs are formed asymmetrically convex in the direction of corresponding contact locations such that the contact portions of the legs cooperating with the contact locations have a greater spacing relative to one another than in a shape that is symmetrically convex relative to the central longitudinal axis of the legs.

8. The contacting device according to claim 1, wherein the switching contact is arranged and embodied such that said switching contact is mechanically not loaded when the cover is closed and locked but without an inserted chip card.

9. The contacting device according to claim 1, wherein the switching contact is snapped into the cover.

10. The contacting device according to claim 1, wherein the switching contact is pressed into the cover.

* * * * *